United States Patent
Koshi

(10) Patent No.: US 10,895,303 B2
(45) Date of Patent: Jan. 19, 2021

(54) DAMPER DEVICE

(71) Applicant: EXEDY Corporation, Neyagawa (JP)

(72) Inventor: Kazuhiro Koshi, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 386 days.

(21) Appl. No.: 15/995,425

(22) Filed: Jun. 1, 2018

(65) Prior Publication Data

US 2019/0003553 A1    Jan. 3, 2019

(30) Foreign Application Priority Data

Jun. 30, 2017  (JP) .................................. 2017-128686

(51) Int. Cl.
  *F16F 15/134* (2006.01)
  *G01M 13/022* (2019.01)
  *F16F 15/315* (2006.01)

(52) U.S. Cl.
  CPC .. *F16F 15/13492* (2013.01); *F16F 15/13438* (2013.01); *F16F 15/315* (2013.01); *G01M 13/022* (2013.01)

(58) Field of Classification Search
  CPC .......... F16F 15/13492; F16F 15/13438; F16F 15/315; F16F 15/134; F16F 15/139; G01M 13/022
  USPC ....................................... 464/68.92; 192/205
  See application file for complete search history.

(56) References Cited

U.S. PATENT DOCUMENTS 6,461,243 B1 * 10/2002 Uehara ............. F16F 15/12326
                                                      192/205
7,077,752 B2 *  7/2006 Rohs ................. F16F 15/12326

FOREIGN PATENT DOCUMENTS

| CN | 1109563 A    | 10/1995 |
| CN | 1127026 A    | 7/1996  |
| CN | 1532435 A    | 9/2004  |
| DE | 3407524 A1   | 9/1985  |
| JP | 2005-299511 A | 10/2005 |
| JP | 2015-086965 A | 5/2015  |
| JP | 2017-061964 A | 3/2017  |
| JP | 2017-166656 A | 9/2017  |

OTHER PUBLICATIONS

1st Office Action for the corresponding Chinese Patent Application No. 201810581981.1, dated Nov. 3, 2020, 6 pp.

* cited by examiner

*Primary Examiner* — Greg Binda
(74) *Attorney, Agent, or Firm* — United IP Counselors, LLC

(57) ABSTRACT

A damper device includes a first rotary member to which a power of an engine is inputted. The second rotary member is disposed to be rotatable relatively to the first rotary member. The plurality of elastic members elastically couple the first rotary member and the second rotary member in a rotational direction. The seat member is disposed between at least one of the first and second rotary members and one of the plurality of elastic members, and is movable in the rotational direction in accordance with compression and extension of the one of the plurality of elastic members. The auxiliary compression mechanism changes a posture of the seat member so as to compress the one of the plurality of elastic members by a predetermined amount in transmitting the power between the first rotary member and the second rotary member.

6 Claims, 4 Drawing Sheets

DAMPER DEVICE

CROSS-REFERENCE TO RELATED APPLICATIONS

This application claims priority to Japanese Patent Application No. 2017-128686 filed on Jun. 30, 2017, the entirety of which is hereby incorporated by reference in its entirety.

BACKGROUND

Technical Field

The present disclosure relates to a damper device.

Background Information

A variety of devices are embedded in a drive train for a vehicle in order to transmit power generated in an engine and attenuate fluctuations in speed of rotation transmitted from the engine (torque fluctuations). For example, Japan Laid-open Patent Application Publication No. 2015-86965 discloses a flywheel assembly for enhancing performance of attenuating torque fluctuations in a wide range of rotational speed. The flywheel assembly includes two flywheels rotatable relatively to each other and a damper mechanism elastically coupling these flywheels in a rotational direction. The damper mechanism includes a plurality of torsion springs and spring seats supporting these torsion springs.

Incidentally, a device for detecting engine misfiring has been provided for a type of vehicle in which such a flywheel assembly as described above is embedded. For example, as described in Japan Laid-open Patent Application Publication No. 2005-299511, a type of device has been known as a device for detecting engine misfiring, which calculates the amount of fluctuations in rotational speed based on an output value from a crank angle sensor and determines occurrence of misfiring with use of a map based on these data.

As described in Japan Laid-open Patent Application Publication No. 2005-299511, when occurrence of misfiring is determined based on data such as the amount of fluctuations in rotational speed (substantially the same as the amount of torque fluctuations), chances are that occurrence of misfiring is erroneously detected because of a configuration of a damper device such as a flywheel assembly. This will be explained as follows.

As described in Japan Laid-open Patent Application Publication No. 2015-86965, a type of damper mechanism elastically coupling two flywheels includes a plurality of torsion springs and a plurality of spring seats. This type of damper mechanism is disposed in an accommodation portion formed by the two flywheels. In this case, when the flywheel assembly is rotated, the torsion springs and the spring seats receive centrifugal forces whereby the outer peripheral surface of each spring seat is configured to be pressed onto the outer peripheral side inner wall surface of the accommodation portion (e.g., the inner peripheral wall surface of the outer peripheral tubular portion of input-side one of the flywheels). In other words, a state is made that each spring seat is attached to the inner wall surface of the accommodation portion.

When torque is inputted to the damper mechanism in the state described above, the torsion springs are configured to be compressed through the spring seats. At this time, in the state that each spring seat is attached to the inner wall surface of the accommodation portion as described above, each spring seat is unlikely to be moved in the rotational direction at the start of torque transmission. Therefore, a torsional characteristic, configured to be herein exerted as a torsional characteristic of the damper mechanism, is not attributed to stiffnesses of the torsion springs per se but attributed to high stiffnesses including stiffnesses of the spring seats and output-side one of the flywheels.

When the torque inputted to the damper mechanism then becomes a predetermined value or greater, the attached state of each spring seat is released and is moved in the rotational direction. Accordingly, the torsion springs are compressed, and the torsional characteristic attributed to the torsion springs is configured to be exerted.

When the aforementioned attached state of each spring seat and releasing thereof are repeated, fluctuations in rotational speed occur due to this phenomenon. Accordingly, it is inevitable that misfiring is erroneously detected as the cause of fluctuations in rotational speed even though misfiring has not actually occurred.

BRIEF SUMMARY

It is an object of the present disclosure to eliminate erroneous misfiring detection caused due to an attached state of a spring seat in a damper device to be used for a vehicle configured to detect misfiring by detecting fluctuations in rotational speed.

(1) A damper device according to the present disclosure includes a first rotary member to which a power of an engine is inputted, a second rotary member disposed to be rotatable relatively to the first rotary member, a plurality of elastic members elastically coupling the first rotary member and the second rotary member in a rotational direction, a seat member and an auxiliary compression mechanism. The seat member is disposed between at least one of the first and second rotary members and one of the plurality of elastic members, and is movable in the rotational direction in accordance with compression and extension of the one of the plurality of elastic members. The auxiliary compression mechanism changes a posture of the seat member so as to compress the one of the plurality of elastic members by a predetermined amount in transmitting the power between the first rotary member and the second rotary member.

In the present device, when the power is inputted thereto from the engine, the power is transmitted from the first rotary member to the second rotary member through the plurality of elastic members. At this time, when the rotation inputted thereto fluctuates in speed, fluctuations in rotational speed are attenuated by compression and extension of the plurality of elastic members.

In the present device, when the power is herein inputted to the first rotary member, the posture of the seat member is changed by the auxiliary compression mechanism before the seat member is moved in the rotational direction, whereby the one of the plurality of elastic members is compressed by the predetermined amount. Thereafter, the seat member is moved in the rotational direction.

The one of the plurality of elastic members can be herein compressed by the predetermined amount before the seat member is moved. Therefore, a torsional characteristic, exerted when the power is inputted to the present device, is attributed to approximately only the stiffness of the one of the plurality of elastic members. In other words, unlike a well-known device, the torsional characteristic does not herein include the stiffness of the seat member and so forth. Therefore, it is possible to eliminate erroneous misfiring detection caused due to an attached state of the seat member.

(2) Preferably, the auxiliary compression mechanism changes the posture of the seat member so as to compress the one of the plurality of elastic members by causing the first or second rotary member to make contact with the seat member.

When the power is inputted to the first rotary member, the first or second rotary member makes contact with the seat member, whereby the seat member is pressed in the rotational direction. The posture of the seat member is changed with use of the pressing force applied to the seat member, whereby the one of the plurality of elastic members is compressed. Therefore, the auxiliary compression mechanism can be realized with a simple configuration.

(3) Preferably, the seat member includes a first contact surface and a second contact surface, one of which is capable of selectively making contact with part of the first or second rotary member. Additionally, the auxiliary compression mechanism changes the posture of the seat member so as to compress the one of the plurality of elastic members by causing one of the first and second contact surfaces of the seat member to make contact with the first or second rotary member.

The seat member is herein provided with the first and second contact surfaces. One of the contact surfaces selectively makes contact with the first or second rotary member, whereby the posture of the seat member is changed. Therefore, the posture of the seat member can be changed with a simple configuration, and the one of the plurality of elastic members can be compressed by the predetermined amount.

(4) Preferably, the seat member includes a support surface supporting an end surface of the one of the plurality of elastic members. Additionally, the auxiliary compression mechanism changes a posture of the support surface so as to compress the one of the plurality of elastic members.

The end surface of the one of the plurality of elastic members is herein supported by the support surface of the seat member. When the posture of the support surface is changed, the one of the plurality of elastic members is compressed by the predetermined amount. Therefore, the one of the plurality of elastic members can be compressed by the predetermined amount with a simple configuration.

(5) Preferably, the seat member includes a first engaging portion on a surface thereof making contact with the first or second rotary member. Additionally, the first or second rotary member includes a second engaging portion. The second engaging portion is capable of being engaged with the first engaging portion of the seat member, and changes the posture of the seat member when engaged with the first engaging portion.

When the second engaging portion of the first or second rotary member is herein engaged with the first engaging portion of the seat member, the posture of the seat member is changed whereby the one of the plurality of elastic members is compressed. Therefore, similarly to the above, the posture of the seat member can be changed with a simple configuration.

(6) Preferably, the first engaging portion is a recess recessed in the rotational direction, and the second engaging portion is a protrusion that protrudes in the rotational direction and is capable of being engaged with the recess.

(7) Preferably, the first rotary member includes an accommodation portion that has an annular shape and is recessed in an axial direction, and the accommodation portion includes an outer peripheral side inner wall surface. The plurality of elastic members and the seat member are accommodated in the accommodation portion of the first rotary member. The seat member includes an outer peripheral side support portion for restricting a rotation directional end of the one of the plurality of elastic members from moving to an outer peripheral side. The first and second contact surfaces of the seat member are provided on an outer peripheral surface of the outer peripheral side support portion. One of the first and second contact surfaces is capable of selectively making contact with the outer peripheral side inner wall surface of the accommodation portion. Additionally, the seat member is capable of taking a first posture and a second posture. The first posture causes the first contact surface to make contact with the outer peripheral side inner wall surface, whereas the second posture causes the second contact surface to make contact with the outer peripheral side inner wall surface.

The seat member is herein accommodated in the annular accommodation portion of the first rotary member. Additionally, the seat member is provided with the first and second contact surfaces on the outer peripheral surface of the outer peripheral side support portion thereof. The seat member is changed in posture between a state that the first contact surface makes contact with the outer peripheral side inner wall surface of the accommodation portion (i.e., the first posture) and a state that the second contact surface makes contact with the outer peripheral side inner wall surface of the accommodation portion (i.e., the second posture).

In this case, the posture of the seat member can be changed without adding a special member to the configuration of the well-known device.

(8) Preferably, the seat member includes the support surface supporting the end surface of the one of the plurality of elastic members. The support surface changes in posture depending on which of the first and second postures the seat member takes. The one of the plurality of elastic members is compressed by the predetermined amount when the seat member changes in posture from the first posture to the second posture.

Similarly to the above, with a simple mechanism, the one of the plurality of elastic members can be herein compressed by the predetermined amount without moving the seat member.

(9) Preferably, the seat member makes contact with the outer peripheral side inner wall surface of the first rotary member in an entirety of a rotation directional actuation region thereof.

In this case, when performing a compression/extension motion, the one of the plurality of elastic members can be stably supported by the seat member.

Overall, according to the present advancement described above, it is possible to eliminate erroneous misfiring detection caused due to an attached state of a spring seat in a damper device to be used for a vehicle configured to detect misfiring by detecting fluctuations in rotational speed.

BRIEF DESCRIPTION OF THE DRAWINGS

Referring now to the attached drawings which form a part of this original disclosure.

DETAILED DESCRIPTION OF EMBODIMENTS

Figure 1:
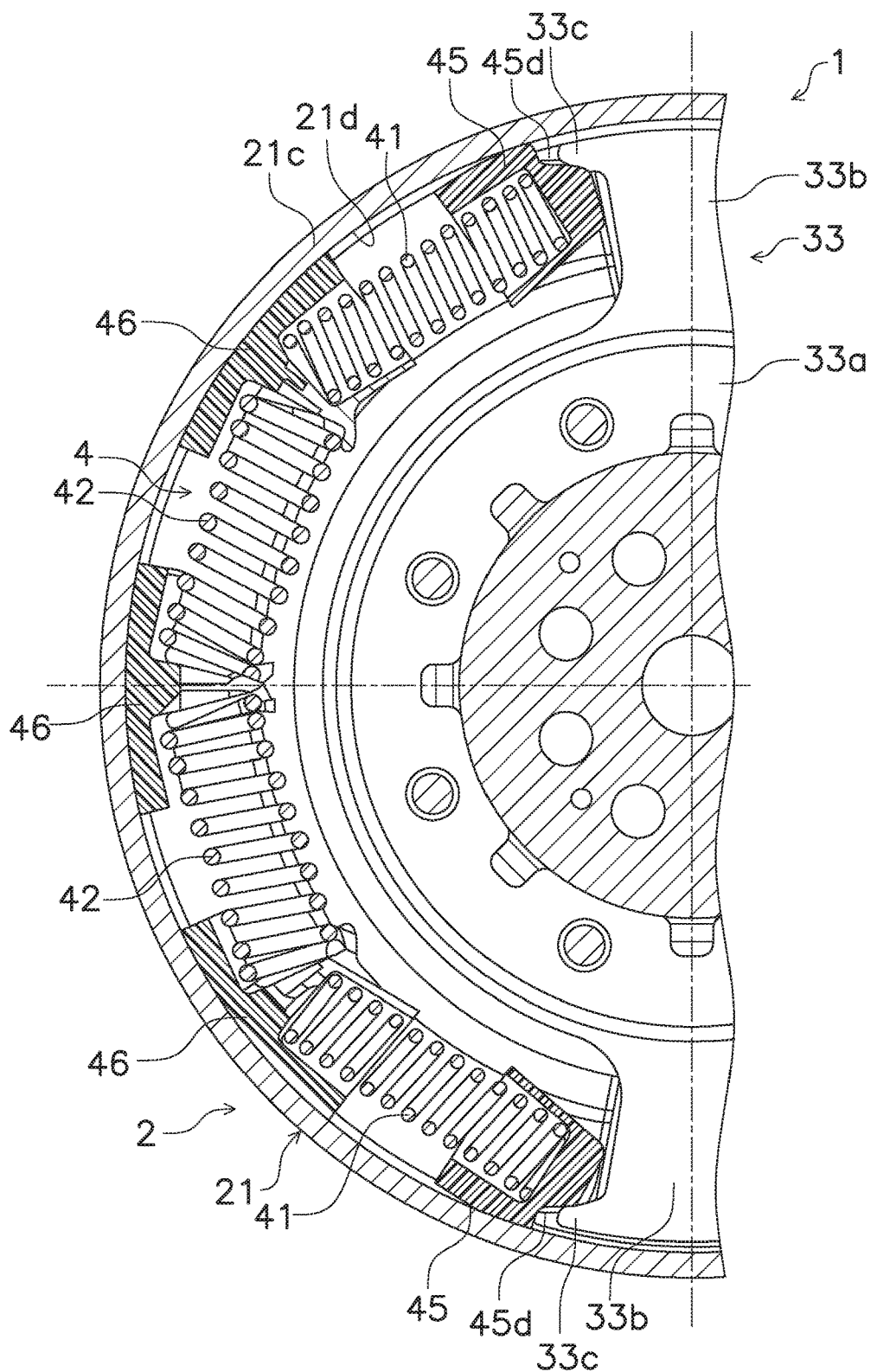
FIG. 1 is a cross-sectional front view of a flywheel assembly according to a preferred embodiment of the present disclosure.
Figure 2:
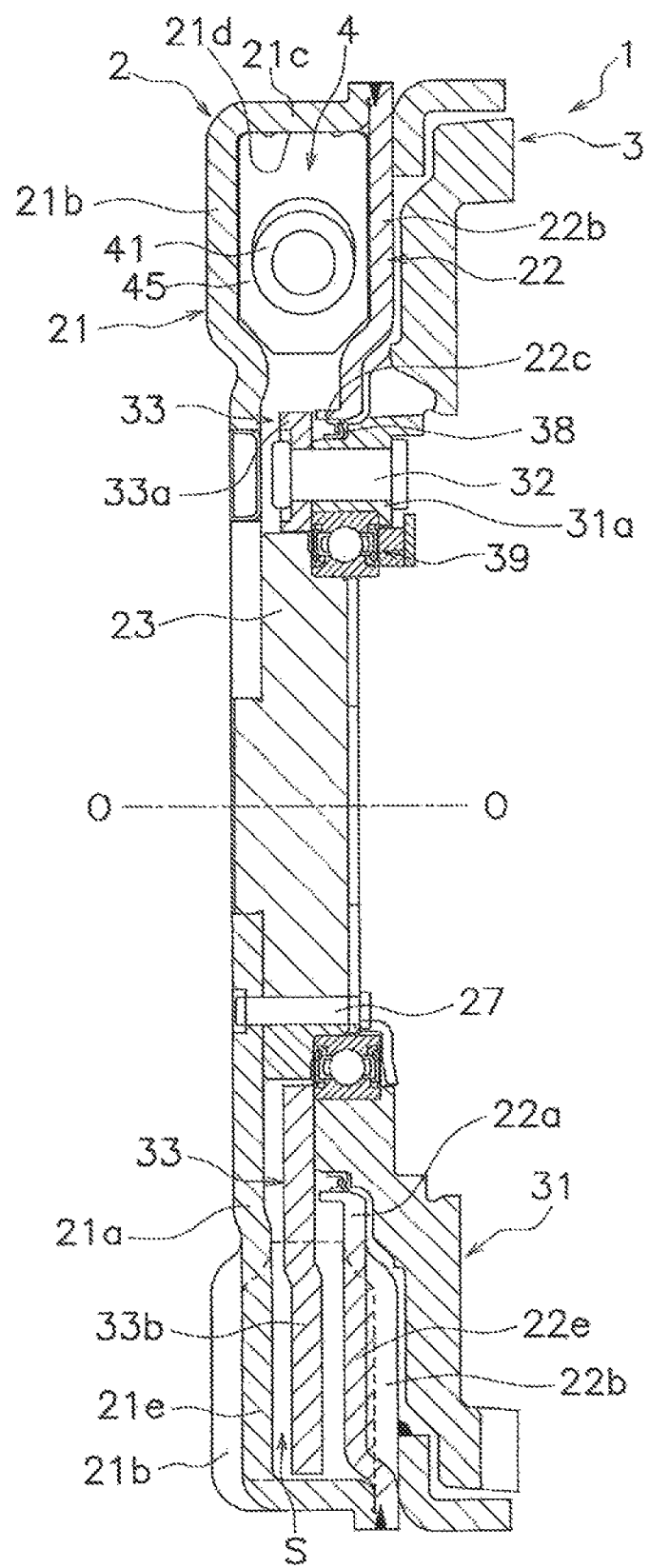
FIG. 2 is a cross-sectional side view of the flywheel assembly shown in FIG. 1.
Figure 3A:
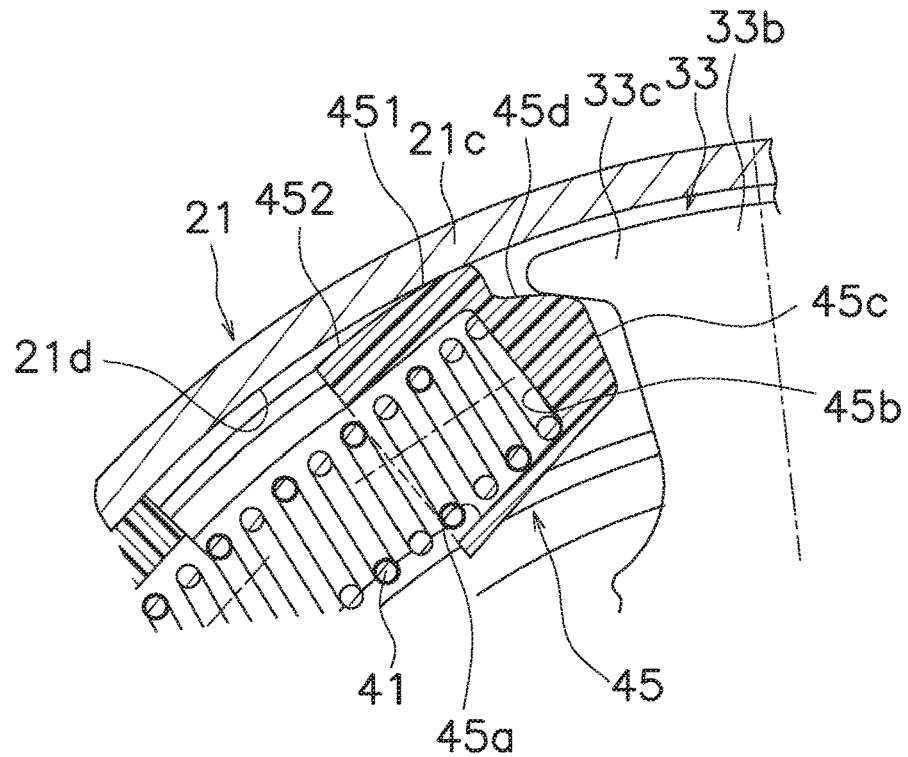
FIG. 3A is a diagram showing a first spring seat taking a first posture.
Figure 3B:
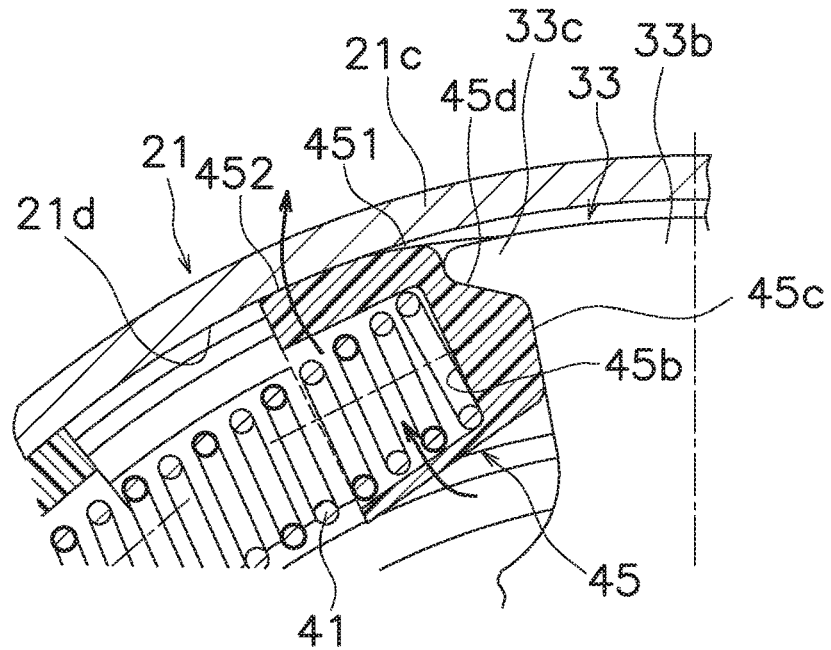
FIG. 3B is a diagram showing the first spring seat taking a second posture.

FIGS. 1 to 3 show a flywheel assembly according to a preferred embodiment of the present disclosure. It should be noted that the flywheel assembly is an exemplary damper device. FIG. 1 is a cross-sectional front view of the flywheel assembly in which illustration of some components of the flywheel assembly such as a second flywheel is omitted. FIG. 2 is a cross-sectional side view of the flywheel assembly, whereas FIGS. 3A and 3B show part of FIG. 1 in enlarged representation.

<Entire Configuration>

A flywheel assembly 1 is a device for transmitting power generated in an engine to a transmission through a clutch device (not shown in the drawings). As shown in FIGS. 1 and 2, the flywheel assembly 1 includes a first flywheel 2 (an exemplary first rotary member), a second flywheel 3 and a damper mechanism 4.

<First Flywheel 2>

The first flywheel 2 is a member to which the power generated in the engine is inputted. The first flywheel 2 is fixed to a crankshaft (not shown in the drawings) of the engine. As shown in FIGS. 1 and 2, the first flywheel 2 includes a first plate 21, a second plate 22 and a support member 23.

The first plate 21 includes a first plate body 21a having a disc shape, two first lateral portions 21b, and a tubular portion 21c axially extending from the outer peripheral part of the first plate body 21a and that of each first lateral portion 21b. Additionally, each first lateral portion 21b includes outer peripheral portions 21e on the rotation directional ends thereof. Each first lateral portion 21b is a portion bulging toward the engine than the first plate body 21a, and is shaped by, for instance, stamping. The two first lateral portions 21b are disposed at equal pitches in the rotational direction.

A second plate 22 is an annular member fixed to the tubular portion 21c, and includes a second plate body 22a having a disc shape, two second lateral portions 22b and an inner tubular portion 22c.

The outer peripheral end of the second plate body 22a is fixed to the distal end of the tubular portion 21c of the first plate 21 by welding. Additionally, outer peripheral portions 22e are provided on the rotation directional ends of each second lateral portion 22b. Each second lateral portion 22b is a portion bulging toward the transmission than the second plate body 22a, and is shaped by, for instance, stamping. The two second lateral portions 22b are disposed at equal pitches in the rotational direction. The inner tubular portion 22c is a tubular portion extending toward the engine from the inner peripheral part of the second plate body 22a, and makes contact at the inner peripheral surface thereof with a seal member 38.

Two relatively wide accommodation spaces S (see FIG. 2) are formed for accommodating the damper mechanism 4 by disposing the second lateral portions 22b in opposition to the first lateral portions 21b in the outer peripheral part of the first flywheel 2.

The support member 23 is fixed to the first plate 21 by, for instance, rivets 27.

<Second Flywheel 3>

The second flywheel 3 is disposed to be rotatable with respect to the first flywheel 2. The second flywheel 3 includes a second flywheel body 31 and an output plate 33 (an exemplary second rotary member). The output plate 33 is fixed to the second flywheel body 31 by rivets 32. The second flywheel 3 is supported by a bearing 39 while being rotatable with respect to the first flywheel 2.

The second flywheel body 31 is an annular member disposed on the transmission side of the second plate 22. An inner peripheral portion 31a of the second flywheel body 31 is rotatably supported by the support member 23 through the bearing 39.

The output plate 33 is fixed to the second flywheel body 31, while being disposed within the accommodation spaces S produced axially between the first plate body 21a and the second plate body 22a. As shown in FIG. 1, the output plate 33 includes a body 33a having an annular shape and two transmission portions 33b provided on the outer peripheral part of the body 33a. The inner peripheral part of the body 33a is fixed to the inner peripheral portion 31a of the second flywheel body 31 by the rivets 32.

The transmission portions 33b protrude further radially outward from the outer peripheral part of the body 33a. Each transmission portion 33b is provided with engaging protrusions 33c (second engaging portions) protruding from the outer peripheral end thereof to both sides in the rotational direction.

<Damper Mechanism 4>

The damper mechanism 4 is a mechanism elastically coupling the first flywheel 2 and the second flywheel 3 in the rotational direction. The damper mechanism 4 includes four first torsion springs 41, four second torsion springs 42, four first spring seats 45 (exemplary seat members) and six second spring seats 46. The first and second torsion springs 41 and 42 are exemplary elastic members. These torsion springs 41 and 42 and spring seats 45 and 46 compose two units. Only one of the units is shown in FIG. 1.

Specifically, each unit is composed of two first spring seats 45, two pairs of the first and second torsion springs 41 and 42 disposed to be interposed between these first spring seats 45 in the rotational direction, and three second spring seats 46, each of which is disposed between each adjacent pair of the torsion springs 41 and 42. Each unit is disposed within each accommodation space S.

Additionally, the damper mechanism 4 is provided with auxiliary compression mechanisms for compressing each first torsion spring 41 by a predetermined amount by changing the posture of each first spring seat 45 without moving each first spring seat 45 in the rotational direction when compression of the first and second torsion springs 41 and 42 is started.

—First and Second Torsion Springs 41 and 42—

As shown in FIG. 1, two first torsion springs 41 and two second torsion springs 42 are disposed to act in series between the first flywheel 2 and the second flywheel 3. Each first torsion spring 41 is a torsion spring with relatively low stiffness, whereas each second torsion spring 42 is a torsion spring with relatively high stiffness. Moreover, the first and second torsion springs 41 and 42 are arranged such that two second torsion springs 42 are interposed between two first torsion springs 41 in the rotational direction.

—First Spring Seats 45 and Auxiliary Compression Mechanisms—

The first spring seats 45 are disposed in the rotation directional ends of each accommodation space S. In other words, the first spring seats 45 are contactable to the outer peripheral portions 21e and 22e, which are the ends of the first and second lateral portions 21b and 22b, and are also contactable to the transmission portions 33b of the output plate 33.

Each first spring seat 45 is disposed between each first torsion spring 41 and each transmission portion 33b of the output plate 33 in the rotational direction, and supports one end of each first torsion spring 41. Each first spring seat 45 is made of resin and has a block shape. As shown close-up in FIG. 3A, a recess 45a, to which one end of each first torsion spring 41 is inserted, is provided on one rotation directional side (the first torsion spring 41 side) of each first spring seat 45. A bottom surface 45b of the recess 45a functions as a support surface that supports one end surface of each first torsion spring 41. A surface 45c is provided on the other rotation directional side (the transmission portion 33b side) of each first spring seat 45, and functions as a contact surface that makes contact with each transmission portion 33b of the output plate 33. The contact surface 45c is provided with an engaging recess 45d (a first engaging portion) that enables one of the engaging protrusions 33c of each transmission portion 33b to be engaged therewith. The engaging recess 45d is provided on part of the outer peripheral part of each first spring seat 45, and has a shape opened to the output plate 33 side and the outer peripheral side.

As shown in FIGS. 3A and 3B, a first contact surface 451 and a second contact surface 452 are provided on the outer peripheral surface of each first spring seat 45 so as to be contactable to an inner peripheral surface 21d (an outer peripheral side inner wall surface) of the tubular portion 21c of the first plate 21. The first contact surface 451 is provided on a side close to the output plate 33, whereas the second contact surface 452 is provided on a side remote from the output plate 33. One of the first and second contact surfaces 451 and 452 is selectively contactable to the inner peripheral surface 21d of the tubular portion 21c. In other words, the first and second contact surfaces 451 and 452 have an equal curvature (equal to the curvature of the inner peripheral surface 21d), but have different centers of curvature. Therefore, the second contact surface 452 does not make contact with the inner peripheral surface 21d of the tubular portion 21c in a state that the first contact surface 451 makes contact therewith. Contrarily, the first contact surface 451 does not make contact with the inner peripheral surface 22d of the tubular portion 21c in a state that the second contact surface 452 makes contact therewith.

In such a configuration, as shown in FIG. 3A, the first contact surface 451 of each first spring seat 45 makes contact with the inner peripheral surface 21d of the tubular portion 21c in a state that one of the engaging protrusions 33c of each transmission portion 33b is not engaged with the engaging recess 45d of each first spring seat 45 (the posture of each first spring seat 45 in this state is defined as "a first posture"). By contrast, as shown in FIG. 3B, when one of the engaging protrusions 33c of each transmission portion 33b is engaged with the engaging recess 45d of each first spring seat 45, each first spring seat 45 rotates on the spot (without moving in the rotational direction) due to this engagement as depicted with arrow in FIG. 3B, and the second contact surface 452 of each first spring seat 45 makes contact with the inner peripheral surface 21d of the tubular portion 21c (the posture of each first spring seat 45 in this state is defined as "a second posture").

Then, when the posture of each first spring seat 45 is changed from the first posture shown in FIG. 3A into the second posture shown in FIG. 3B, the support surface 45b of each first spring seat 45 is changed in posture such that the inner peripheral side thereof is moved toward each first torsion spring 41. Therefore, each first torsion spring 41 is configured to be compressed by a predetermined amount even though each first spring seat 45 is not moved in the rotational direction.

As described above, one of the engaging protrusions 33c of each transmission portion 33b and the engaging recess 45d of each first spring seat 45 compose each auxiliary compression mechanism that changes the posture of each first spring seat 45 between the first posture and the second posture whereby each first torsion spring 41 is compressed by the predetermined amount.

—Second Spring Seats 46—

The second spring seats 46 support the other ends of the first torsion springs 41 and both ends of the second torsion springs 42 in both the radial direction and the axial direction. Specifically, the second spring seats 46 are disposed between the other end of each first torsion spring 41 and one end of each second torsion spring 42 adjacent to each first torsion spring 41 and between two second torsion springs 42, respectively. Each second spring seat 46 is made of resin and has a block shape. Each second spring seat 46 is provided with recesses on both rotation directional sides thereof so as to support the ends of the first and second torsion springs 41 and 42 adjacent to each other or the ends of two second torsion springs 42.

It should be noted that two second spring seats 46, each of which is disposed between each pair of the first and second torsion springs 41 and 42 adjacent to each other, and one second spring seat 46 disposed between two second torsion springs 42 are different in shape, but detailed explanation thereof will be herein omitted.

<Actions>

As described above, the damper mechanism 4 is composed of two units, but one of the units will be hereinafter focused and explained for easy explanation.

In a state that power is not being transmitted from the engine to a clutch disc assembly through the flywheel assembly 1, each transmission portion 33b of the output plate 33 and each first spring seat 45 are not press-contacted to each other. Therefore, one of the engaging protrusions 33c of each transmission portion 33b is not engaged with the engaging recess 45d of each first spring seat 45, and each first spring seat 45 takes the first posture as shown in FIG. 3A.

When this state transitions to a state that the clutch disc assembly is pressed onto the second flywheel 3, power is transmitted from the engine to the transmission through the flywheel assembly 1 and the clutch disc assembly.

In such a power transmission activated state, each transmission portion 33b of the output plate 33 presses the contact surface 45c of each first spring seat 45. Accordingly, one of the engaging protrusions 33c of each transmission portion 33b is engaged with the engaging recess 45d of each first spring seat 45, and the posture of each first spring seat 45 transitions from the first posture to the second posture as shown in FIG. 3B. As explained above in detail, each first torsion spring 41 is compressed by the predetermined amount due to this change in posture of each first spring seat 45. In other words, each first spring seat 45 changes in posture without moving in the rotational direction, whereby each first torsion spring 41 is compressed by the predetermined amount. Because of this, a torsional characteristic, exerted as the torsional characteristic of the flywheel assembly 1 when power transmission is started, is not a torsional characteristic including stiffnesses of the first spring seats 45a and the output plate 33 but that attributed to approximately only stiffnesses of the first torsion springs 41. Therefore, it is possible to prevent erroneous misfiring detection attributed to an attached state of each first spring seat in the well-known device.

It should be noted that after each auxiliary compression mechanism operates as described above, each first spring seat 45 is moved in the rotational direction while keeping the second posture. In other words, each first spring seat 45 is moved in the rotational direction in accordance with compression and extension of each first torsion spring 41, while the second contact surface 452 keeps making contact with the inner peripheral surface 21*d* of the tubular portion 21*c*.

Figure 4:
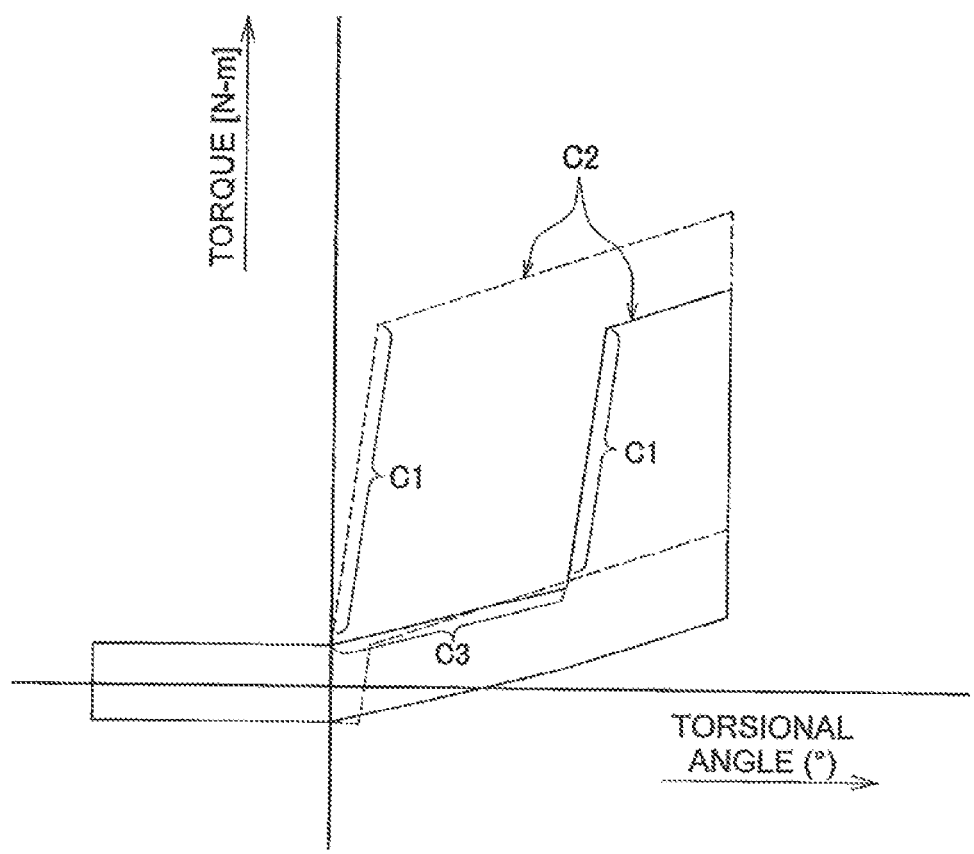
FIG. 4 is a torsional characteristic diagram of the flywheel assembly for explaining advantageous effects of the preferred embodiment of the present disclosure.

FIG. 4 shows difference in torsional characteristics between the present preferred embodiment described above and the well-known device. It should be noted that in FIG. 4, the torsional characteristics are schematically shown without based on actual measurement.

In FIG. 4, broken line indicates torsional characteristics of the well-known device, whereas solid line indicates those of the present preferred embodiment. Characteristic C1 indicates a torsional characteristic attributed to the first spring seats and the output plate, whereas characteristic C2 indicates that attributed to only the first torsion springs. On the other hand, characteristic C3 indicates a torsional characteristic where each first torsion spring 41 is compressed by change in posture of each first spring seat 45.

As is obvious from FIG. 4, when power transmission is started, the stiffness in the torsional characteristic is lower in the present preferred embodiment than in the well-known device. Therefore, it is possible to prevent erroneous misfiring detection that has occurred in the well-known device.

Other Preferred Embodiments

The present advancement is not limited to the aforementioned preferred embodiment, and a variety of changes and modifications can be made without departing from the scope of the present disclosure.

(1) The number, arrangement, stiffness and so forth of the first torsion springs and those of the second torsion springs are not limited to those in the aforementioned preferred embodiment.

(2) In the aforementioned preferred embodiment, the first spring seats 45 are configured to support one circumferential-side end of one of the two first torsion springs 41 composing one unit and the other circumferential-side end of the other of the two first torsion springs 41. However, one first spring seat can be provided on the end of only one of the two first torsion springs in one unit.

(3) In the aforementioned preferred embodiment, the output plate 33 is provided with the engaging protrusions 33*c*. However, engaging protrusions can be provided on part of the outer peripheral portions 21*e* and 22*e* of the first and second lateral portions 21*b* and 22*b* of the first flywheel 2, and can be configured to be engaged with the engaging recesses 45*d* of the first spring seats 45.

(4) The aforementioned preferred embodiment has explained that the present disclosure is applied to the flywheel assembly. However, the present disclosure is also applicable to other types of damper device.

What is claimed is:
1. A damper device comprising:
a first rotary member to which a power of an engine is inputted;
a second rotary member disposed to be rotatable relative to the first rotary member;
a plurality of elastic members configured to elastically couple the first rotary member and the second rotary member in a rotational direction;
a seat member disposed between at least one of the first and second rotary members and one of the plurality of elastic members, the seat member movable in the rotational direction in accordance with compression and extension of the one of the plurality of elastic members; and
an auxiliary compression mechanism configured to change a posture of the seat member by causing the first or second rotary member to contact the seat member so as to compress the one of the plurality of elastic members by a predetermined amount in transmitting the power between the first rotary member and the second rotary member,
the seat member including a first engaging portion on a surface thereof configured to contact the first or second rotary member, the first engaging portion being a recess recessed in the rotational direction, and
the first or second rotary member including a second engaging portion, the second engaging portion being a protrusion protruding in the rotational direction configured to be engaged with the recess, the protrusion configured to change the posture of the seat member when engaged with the recess.

2. The damper device according to claim 1, wherein the seat member includes a support surface configured to support an end surface of the one of the plurality of elastic members, and
the auxiliary compression mechanism changes a posture of the support surface so as to compress the one of the plurality of elastic members.

3. The damper device according to claim 1, wherein the seat member includes a first contact surface and a second contact surface, one of the first and second contact surfaces configured to selectively contact part of the first or second rotary member, and
the auxiliary compression mechanism changes the posture of the seat member by causing one of the first and second contact surfaces of the seat member to contact the first or second rotary member.

4. The damper device according to claim 3, wherein the first rotary member includes an accommodation portion having an annular shape, the accommodation portion recessed in an axial direction, the accommodation portion including an outer peripheral side inner wall surface,
the plurality of elastic members and the seat member are accommodated in the accommodation portion of the first rotary member,
the first and second contact surfaces of the seat member are provided on an outer peripheral surface of the seat member, one of the first and second contact surfaces configured to selectively contact the outer peripheral side inner wall surface of the accommodation portion, and
the seat member is configured to take a first posture and a second posture, the first posture for causing the first contact surface to contact the outer peripheral side inner wall surface, the second posture for causing the second contact surface to contact the outer peripheral side inner wall surface.

5. The damper device according to claim 4, wherein the seat member includes a support surface configured to support an end surface of the one of the plurality of elastic members, the support surface changes in posture depending on which of the first and second postures the seat member takes, and the one of the plurality of elastic members is compressed by the predetermined amount when the seat member changes in posture from the first posture to the second posture.

6. The damper device according to claim 4, wherein the seat member contacts an outer peripheral side inner wall surface of the first rotary member in the rotational direction.

* * * * *